US007836437B2

(12) United States Patent
Kacmarcik

(10) Patent No.: US 7,836,437 B2
(45) Date of Patent: Nov. 16, 2010

(54) SEMANTIC ANNOTATIONS FOR VIRTUAL OBJECTS

(75) Inventor: Gary J. Kacmarcik, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 11/352,000

(22) Filed: Feb. 10, 2006

(65) Prior Publication Data

US 2007/0238520 A1 Oct. 11, 2007

(51) Int. Cl.
*G06F 9/44* (2006.01)
(52) U.S. Cl. ...................................... 717/139
(58) Field of Classification Search ................. 715/706, 715/757, 778, 783, 839, 764; 463/32; 707/101–102; 717/139, 137
See application file for complete search history.

(56) References Cited

U.S. PATENT DOCUMENTS

| | | | | |
|---|---|---|---|---|
| 6,073,115 A * | 6/2000 | Marshall | ...................... | 705/35 |
| 6,160,551 A * | 12/2000 | Naughton et al. | ........... | 715/769 |
| 6,229,533 B1 * | 5/2001 | Farmer et al. | ................ | 345/473 |
| 6,289,299 B1 * | 9/2001 | Daniel et al. | ................... | 703/21 |
| 6,476,830 B1 * | 11/2002 | Farmer et al. | ................ | 715/769 |
| 6,560,511 B1 * | 5/2003 | Yokoo et al. | ................ | 700/245 |
| 6,591,250 B1 * | 7/2003 | Johnson et al. | ................ | 705/51 |
| 6,690,883 B2 * | 2/2004 | Pelletier | ...................... | 396/321 |
| 6,760,026 B2 * | 7/2004 | Li et al. | ....................... | 345/427 |
| 6,767,287 B1 * | 7/2004 | Mcquaid et al. | ............... | 463/42 |
| 6,884,172 B1 * | 4/2005 | Lloyd et al. | .................... | 463/42 |
| 7,298,378 B1 * | 11/2007 | Hagenbuch et al. | ......... | 345/589 |
| 7,373,377 B2 * | 5/2008 | Altieri | ........................ | 709/203 |
| 7,396,281 B2 * | 7/2008 | Mendelsohn et al. | .......... | 463/42 |
| 7,441,190 B2 * | 10/2008 | Asami | ........................ | 715/706 |
| 7,529,772 B2 * | 5/2009 | Singh | ............................... | 1/1 |
| 7,663,671 B2 * | 2/2010 | Gallagher et al. | ......... | 348/231.2 |
| 2002/0010571 A1 * | 1/2002 | Daniel et al. | .................. | 703/21 |

(Continued)

FOREIGN PATENT DOCUMENTS

EP 0992266 * 12/2004

OTHER PUBLICATIONS

Kleinermann, Frederic "Intelligent Modelling of Virtual Worlds Using Domain Ontologies" 2004 Preceedings of the IADIS International Conference. Published by IADIS Press vol. 1 p. 683-690.*

(Continued)

*Primary Examiner*—Anna Deng
(74) *Attorney, Agent, or Firm*—Joseph R. Kelly; Westman, Champlin & Kelly, P.A.

(57) ABSTRACT

Methods are disclosed for providing virtual objects and associating semantic annotations with the virtual objects. A user may be enabled to take virtual photographs of the virtual objects, wherein the semantic annotations associated with the virtual objects visible in the virtual photograph are stored with the virtual photograph. The virtual objects may be included in a virtual world. The user may be enabled to query a computer-controlled character about a virtual object in the virtual photograph, or in a virtual world in realtime, wherein the computer-controlled character is enabled to respond to the query by combining the semantic annotation associated with the virtual object in the virtual photograph with additional semantic annotations tagged to the computer-controlled character or a context of the virtual world to dynamically provide a semantic output, in various embodiments.

17 Claims, 5 Drawing Sheets

U.S. PATENT DOCUMENTS

| | | | |
|---|---|---|---|
| 2002/0033839 A1* | 3/2002 | Elber et al. | 345/700 |
| 2002/0046050 A1* | 4/2002 | Nakazawa et al. | 705/1 |
| 2002/0075282 A1* | 6/2002 | Vetterli et al. | 345/632 |
| 2002/0087546 A1* | 7/2002 | Slater et al. | 707/10 |
| 2002/0093538 A1* | 7/2002 | Carlin | 345/778 |
| 2002/0113823 A1* | 8/2002 | Card et al. | 345/776 |
| 2002/0178096 A1* | 11/2002 | Marshall | 705/35 |
| 2003/0139209 A1* | 7/2003 | Nakayama | 463/6 |
| 2003/0236119 A1* | 12/2003 | Forlines et al. | 463/41 |
| 2004/0036721 A1* | 2/2004 | Anderson et al. | 345/848 |
| 2004/0114176 A1* | 6/2004 | Bodin et al. | 358/1.15 |
| 2004/0193441 A1* | 9/2004 | Altieri | 705/1 |
| 2005/0116964 A1* | 6/2005 | Kotake et al. | 345/629 |
| 2005/0187015 A1* | 8/2005 | Suzuki et al. | 463/32 |
| 2005/0216515 A1* | 9/2005 | Bray et al. | 707/104.1 |
| 2005/0272504 A1* | 12/2005 | Eguchi et al. | 463/40 |
| 2005/0273458 A1* | 12/2005 | Adams | 707/1 |
| 2007/0050715 A1* | 3/2007 | Behar | 715/706 |
| 2007/0075993 A1* | 4/2007 | Nakanishi et al. | 345/419 |
| 2008/0120558 A1* | 5/2008 | Nathan et al. | 715/764 |
| 2008/0270947 A1* | 10/2008 | Elber et al. | 715/852 |
| 2009/0125481 A1* | 5/2009 | Mendes da Costa et al. | 707/3 |
| 2009/0144148 A1* | 6/2009 | Jung et al. | 705/14 |
| 2009/0221367 A1* | 9/2009 | Longley et al. | 463/32 |

OTHER PUBLICATIONS

Otto, Karsten "Towards Semantic Virtual Environments" 2003 Freie University, Berlin.*

"Towards Semantic Virtual Environments", Otto, Karsten. 2003 Freie University, Berlin.*

"The future of Video Games as an Art: On the Art of Playing with Shadows" Ellen Sandor and Janine Fron. Oct. 26, 2001. The University of Chicago Cultural Policy Center.*

Tennant, H., Ross, K., Saenz, R., Thompson, C., and Miller, J. 1983. Menu-Based Natural Language Understanding. 151-158.

Kobsa, A., Allgayer, J., Reddig, C., Reithinger, N., Schmauks, D., Harbusch, K., and Wahlster, W. 1986. Combining Deictic Gestures and Natural Language for Referent Identifications. 356-361.

Andre, E and Rist, T. 1994. Referring to World Objects with Text and Pictures. 1-12.

Town, S., Callaway, C., and Lester, J. 1998. Generating Coordinated Natural Language and 3D Animations for Complex Spatial Explanations. 8 pages.

Campbell, R. and Suzuki, H. 2002. Language-Neutral Representation of Syntactic Structure. 11 pages.

Aikawa, T., Melero, M., Schwartz, L., and Wu A. 2001. Multilingual Sentence Generation. 7 pages.

Corston-Oliver, S., Gamon, M., Ringger, E., and Moore, R. 2002. An Overview of Amalgam: A Machine-Learned Generation Module. 8 pages.

Schwartz, L., Aikawa, T., and Pahud, M. 2004. Dynamic Language Learning Tools. Proceedings of InSTIL/ICALL2004. 4 pages.

Rose, E., Breen, D., Ahlers, K., Crampton, C., Tuceryan, M., Whitaker, R., and Greer, D. 1994. Annotating Real-World Objects Using Augmented Reality. 1-17.

* cited by examiner

SEMANTIC ANNOTATIONS FOR VIRTUAL OBJECTS

BACKGROUND

Computing device-executed applications are often used to simulate virtual characters and virtual worlds. Such virtual worlds may be used, for example, in video games, or in training or educational programs. Many separate virtual characters may be included in a single virtual world. This is particularly true of large-scale virtual worlds such as in massively multiplayer online role-playing games (MMORPG's), in which a single virtual world runs for years at a time and which have already accommodated millions of separate players and computer-controlled non-player characters within a single virtual world. Outside of more extensive virtual settings may include, for example, a virtual assistant that appears on a monitor to answer questions or otherwise provide help with an application. Virtual worlds and virtual characters support a broad range of applications that have demonstrated a strong and persistently growing demand. There is correspondingly a great interest in improving the sophistication with which game players or other users of a virtual setting may interact with virtual worlds and virtual characters. Interaction with computer-controlled characters has been of limited sophistication due in large measure to challenges in natural language processing.

The discussion above is merely provided for general background information and is not intended to be used as an aid in determining the scope of the claimed subject matter.

SUMMARY

Methods are disclosed for providing virtual objects and associating semantic annotations with the virtual objects. A user may be enabled to take virtual photographs of the virtual objects, wherein the semantic annotations associated with the virtual objects in the virtual photograph are stored with the virtual photograph. The virtual objects may be included in a virtual world. The user may be enabled to interact with a computer-controlled character to discuss a virtual object in the virtual photograph, or in a virtual world in realtime, wherein the computer-controlled character is enabled to respond to the user interaction by combining the semantic annotation associated with the virtual object in the virtual photograph with additional semantic annotations tagged to the computer-controlled character or a context of the virtual world to dynamically provide a semantic output, in various embodiments. The methods may be implemented at least in part by a computing device or stored on a medium as executable instructions that can be read and executed by a computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background. Various embodiments provide a wealth of additional and unexpected advantages, beyond the resolution of difficulties with current solutions. A variety of other variations and embodiments besides those illustrative examples specifically discussed herein are also contemplated, and may be discerned by those skilled in the art from the entirety of the present disclosure.

DETAILED DESCRIPTION

Methods are disclosed as follows for providing virtual objects and associating semantic annotations with the objects, according to a variety of embodiments. The semantic annotations may be created by a variety of methods, including by parsing a natural language input. A virtual world may also be created and provided with such virtual objects, and computer-controlled characters or contexts that also have semantic annotations associated with them. A user may be enabled to take virtual photographs in the virtual world, wherein the semantic annotations associated with objects in the photograph are stored with the photograph. The user may be enabled to refer to a virtual object in the user's interactions with a computer-controlled character, such as to query the computer-controlled character about an object in the photograph, or in the virtual world in realtime, wherein the computer-controlled character is enabled to respond to the query by combining the semantic annotation associated with the virtual object with additional semantic annotations tagged to the computer-controlled character or a context of the virtual world to dynamically provide a semantic output, in various embodiments.

These embodiments may be applied in computer games, such as role-playing games, including massively multiplayer online role-playing games. Various embodiments may also be advantageously applied to other virtual environments, such as training or educational applications, or a general user interface, and potentially to any kind of human-computer interaction. Various embodiments disclosed herein may enable semantic information to be stored about any object depicted by a software application, and allow a software application to provide interesting and context-sensitive dialogue with a human user about the depicted object.

Figure 1:
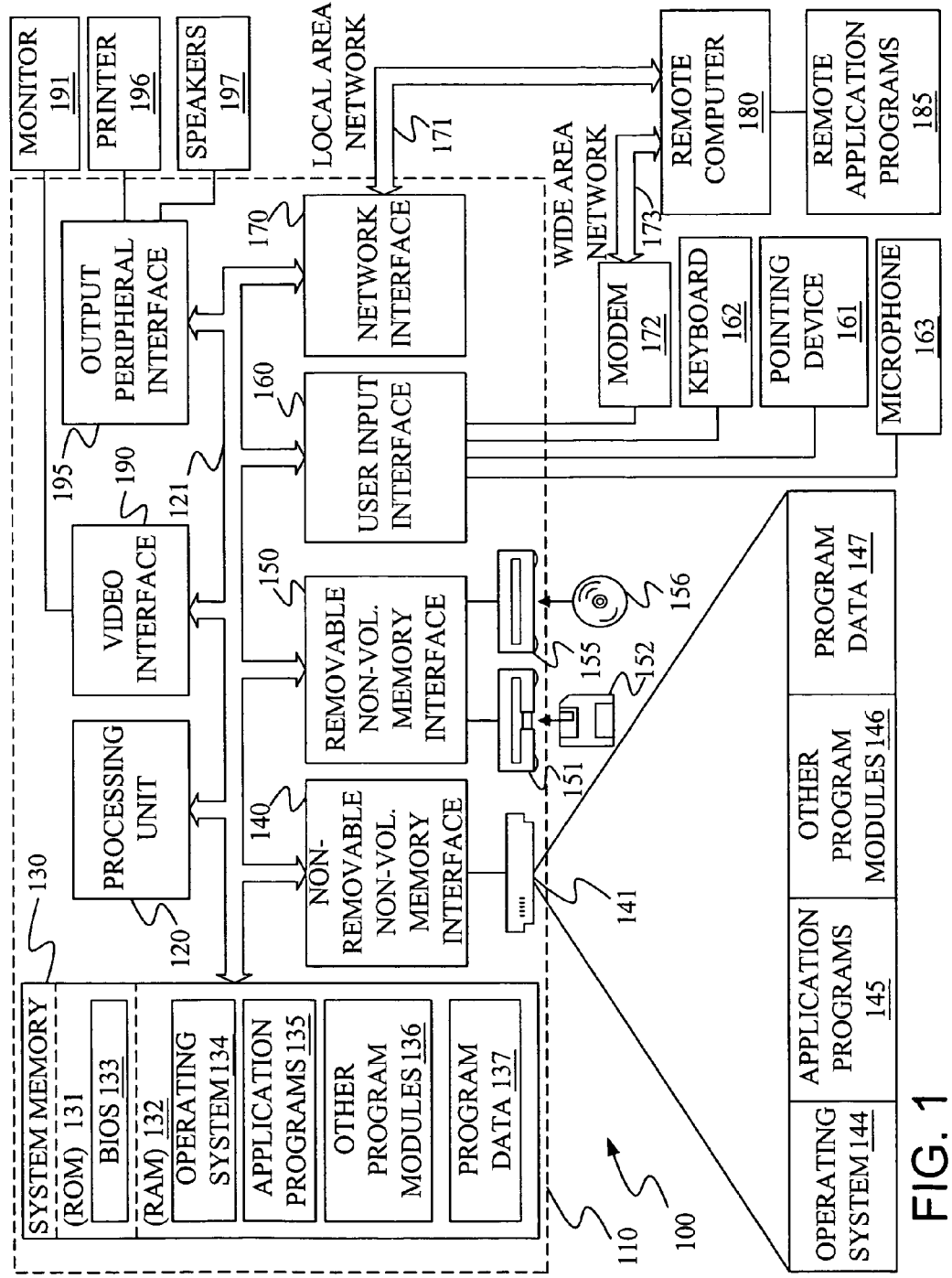
FIG. 1 depicts a block diagram of a general computing environment, comprising a computer and a medium, readable by the computer and comprising executable instructions that are executable by the computer, according to an illustrative embodiment.

Prior to discussing particular aspects of present embodiments in greater detail, a few illustrative systems and environments with which various embodiments can be used are discussed. FIG. 1 depicts a block diagram of a general computing environment 100, comprising a computer 110 and various media such as system memory 130, nonvolatile magnetic disk 152, nonvolatile optical disk 156, and a medium of remote computer 180 hosting remote application programs 185, the various media being readable by the computer and comprising executable instructions that are executable by the computer, according to an illustrative embodiment. FIG. 1 illustrates an example of a suitable computing system environment 100 on which various embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
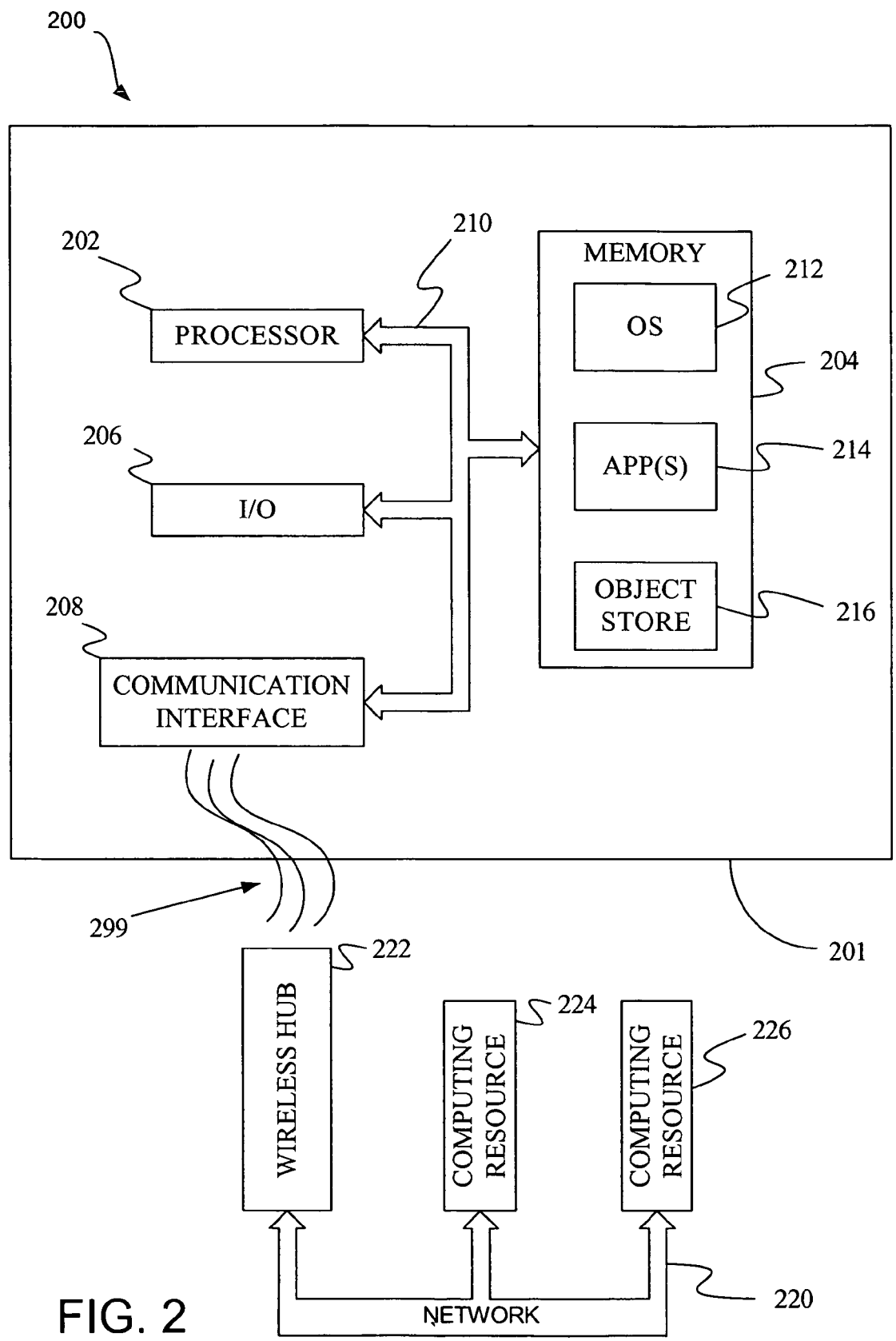
FIG. 2 depicts a block diagram of a general mobile computing environment, comprising a mobile computing device and a medium, readable by the mobile computing device and comprising executable instructions that are executable by the mobile computing device, according to another illustrative embodiment.

FIG. 2 depicts a block diagram of a general mobile computing environment, comprising a mobile computing device and a medium, readable by the mobile computing device and comprising executable instructions that are executable by the mobile computing device, according to another illustrative embodiment. FIG. 2 depicts a block diagram of a mobile computing system 200 including mobile device 201, according to an illustrative embodiment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may for example be the Internet, or some scale of area network—by sending and receiving electromagnetic signals 299 of a suitable protocol between communication interface 208 and wireless hub 222. Wireless hub 222 in turn provides access via network 222 to a wide array of additional computing resources, illustratively represented by computing resources 224 and 226. Computing device 201 is enabled to make use of executable instructions stored on the media of memory component 204, such as executable instructions that enable computing device to create or access virtual worlds with semantically tagged objects according to various embodiments. For example, the executable instructions may enable mobile computing device 201 to receive input defining an object in a virtual setting, and associate a semantic annotation with the object, according to one illustrative embodiment.

Figure 3:
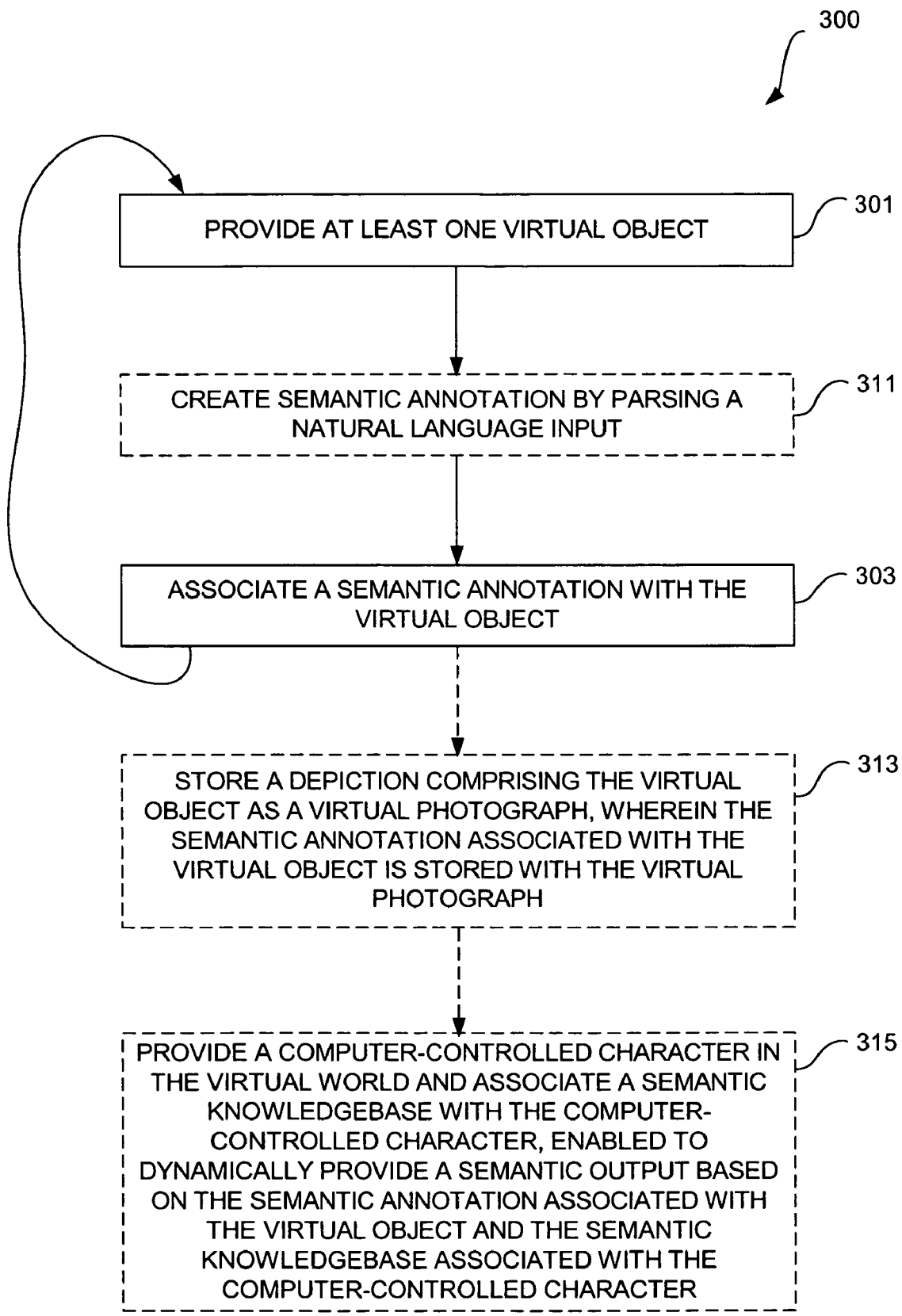
FIG. 3 depicts a flowchart for a method 300 of providing at least one virtual object, and associating a semantic annotation with the virtual object, according to another illustrative embodiment.

FIG. 3 depicts a flowchart for a method 300 that includes providing at least one virtual object, as at step 301, and associating a semantic annotation with the virtual object, as at step 303, according to one illustrative embodiment. The computing device may receive input from a user that defines the virtual object, potentially as an object in a virtual world. The computing device may also be enabled to receive an input relating to the object, and provide the semantic annotation based on the input, as described further below. Method 300 may also include optional steps including, among various other options, step 311, to create a semantic annotation by parsing a natural language input; step 313, to store a depiction comprising the virtual object as a virtual photograph, wherein the semantic annotation associated with the virtual object is stored with the virtual photograph; or step 315, to provide computer-controlled characters (also referred to as non-player characters) in the virtual world and associate semantic knowledgebases with the computer-controlled characters, such that they are enabled to dynamically provide a semantic output based on the semantic annotations associated with the virtual objects and the semantic knowledgebases associated with computer-controlled characters. These and other possible steps are further disclosed below.

Method 300 may be implemented at least in part by a computing device, such as computer 110 or remote computer 180 of FIG. 1 or mobile computing device 201 or computing resources 224, 226 of FIG. 2, for example. Method 300 may be implementable by a computing device by enabling the computing device through executable instructions stored on a medium readable by the computing device, for example. The term "computer" may be used interchangeably with the term "computing device", without implying any limitation on the particular form of computing device that may be involved in different embodiments.

The virtual object being referred to in method 300 is not to be confused with an object in object-oriented programming. A virtual "object" may be, for example, a house or a tree in a virtual world, or an invisible object, a character, or an abstract entity such as an event in a virtual world, or a virtual object or character depicted in a software application, such as a helper or assistant for the application. A virtual object could also exist within a virtual world within a component that controls a tangible robot, where the virtual world could comprise a representation of the real world, where moving mechanical parts, rather than a depiction on a monitor, serves to embody the software-driven actions of the robot. Virtual "object" here is used to serve as the most broad and generic description for anything in a virtual world or any thing otherwise virtually depicted under the control of a computer. These are described further below.

The semantic annotations tagged to or associated with the virtual objects are more than mere text labels. Rather, they store or encode semantic information that provides a linguistic description or abstract representation of the annotated object, and that may be referred to or combined along with other semantic annotations to produce semantic combinations that are also linguistically meaningful. These semantic annotations therefore allow a user to interact with computer-controlled characters in reference to the semantically tagged virtual objects in a more meaningful way. A computer-controlled character may also have a semantic annotation, or a semantic knowledgebase that includes several semantic annotations. If simple text labels were used rather than semantic tags, non-player characters would all be limited to making the same responses in reference to the labeled object. Instead, with semantic annotations, the computing device is able to merge the semantic annotation of an object with the semantic knowledgebase of a non-player character, so that each non-player character has the potential to make different responses or remarks about the same virtual object, in this embodiment.

In one illustrative embodiment, which is useful for illustrating examples of the operation of method 300, a software application is provided that a game developer uses to create a three-dimensional virtual world. This virtual world may have the sizes, shapes, and positions of various virtual objects in it stored in a computer memory. When a game is executed making use of the virtual world, a variety of changes and events in the three-dimensional virtual construct may be provided and tracked by the computer memory, included changes introduced by human players.

One illustrative advantage for virtual objects being stored with semantic annotations is to allow a user to interact with the objects and receive sophisticated, context-sensitive outputs related to the virtual objects. For example, in the present illustrative embodiment of method 300 being applied to developing a computer game, the game may allow a user to control a virtual character as a player in the game. The player may encounter various objects and ask about or discuss the objects with non-player characters, who are controlled by the computer or other computing device. The computer-controlled character may respond to the player based on a semantic annotation associated with the virtual object. The computer-controlled character may also potentially combine this semantic annotation from the object with additional semantic annotations or a semantic knowledgebase tagged to the computer-controlled character, to a general context of that place and time in the virtual world, or to other objects. In this case, the computer-controlled characters and contexts may also serve as virtual objects like any others in some ways. Because the computer-controlled characters provide responses to the player that may be based on or combine semantic annotations from various sources after the player selects a virtual object and interacts with a computer-controlled character regarding that object, these responses are said to be dynamically created, rather than pre-scripted. The computer, through a computer-controlled character, may not contain any knowledge of what responses it will be providing a player until after the player interacts with the computer-controlled character, at which point the computer can call upon the various annotated objects available at that time and combine the semantic annotations from one or more of them to produce a response.

There are a variety of ways in which the semantically provided semantic output can be based on the various available semantic annotations. For example, the computer-controlled character may provide the semantic output after a semantic output generation component creates a natural language text output directly from the applicable semantic annotation or annotations, in one illustrative embodiment. The generation component therefore generates a plain language, human-readable text out of a combination of the semantic annotations.

While references are made in these particular embodiments to entering and generating text, other embodiments may be combined with other user interface and natural language technologies to use other forms of input and output, such as handwriting input or speech input and output, for example.

A software package according to the present embodiment may enable a developer to create virtual objects with which to populate a virtual world. The developer may specify the size, dimensions, texture, and position of an object in the virtual world, such as a house, for example. The three-dimensional world, as it is modeled on the computer, may be depicted in two-dimensional views on a flat computer monitor, such as to represent the perspective view of a player character within the game, for example; in another option, the virtual world may be depicted according to a "bird's-eye" view from outside the player character. The two-dimensional depiction of the three-dimensional virtual world may use a scene graph, a data structure containing the heirarchy of the objects in the virtual world. An object in the virtual world, such as the house, occupies a specified portion of the pixels of the two-dimensional view of the virtual world, when it is in view. The virtual object has associated with it an object identifier. As the three-dimensional virtual object is rendered in a two dimensional view, the pixels in its two-dimensional rendering each have specified a color and an object identifier. The specified color may be encoded in RGB format as certain percentages of red, green, and blue. The object identifier does not have any visible effect on the screen, but it serves as a reference for the association of the corresponding semantic annotation tag to the object.

The semantic annotation allows the object not only to be identified, but to be described in a linguistically meaningful way. The game developer is able to provide descriptive inputs that are directly or indirectly recorded as the semantic annotation. Different mechanisms for both direct and indirect entry of semantic annotations are further described as follows.

In one embodiment, the semantic annotations may be entered directly by the developer of the virtual world. This has the advantage that it allows the developer's intended semantic meanings to be encoded with precision. It uses a formal notation that allows logical precision and forestalls ambiguity. However, it also has the drawback that coding semantic annotations from scratch requires mastery of a fairly difficult understanding of semantic representations. A wide range of semantic representation systems are used; for example, several semantic representation systems are based on different variations of a first-order predicate calculus representation.

Another system of creating semantic representations works indirectly, but requires far less training: to use natural language descriptive inputs, that the software then parses into a relatively simple representation style known as "logical form". The logical form encodes semantic relations between terms in different semantic descriptions. Encoding semantic annotations with logical forms is described briefly as follows.

In one example, a developer uses a software application embodying a method or computer-executable instructions, to add semantic annotations to an object and to the semantic knowledgebase of a computer-controlled (or non-player) character. The annotation added to the object may be input by the developer in natural language form as "This(242) is a cave." This natural language annotation as input by the developer is then translated into a semantic annotation by a natural language tool, such as a parsing tool, associated with or included in a software application embodying a method or executable instructions for associating semantic annotations with virtual objects. The semantic annotations may take a form corresponding to the following illustrative representations. "This(242) is a cave" may be semantically represented as:

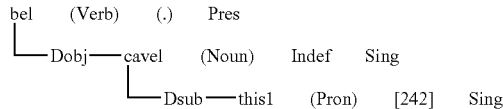

This semantic annotation encodes the semantic relations (or "semrels") between the content words. In this semantic annotation, the "Dsub", or the deep subject, is "this" ("this1"), which is indicated to be a singular pronoun, and to be associated with object identifier tag 242 (not depicted in FIGS. 3, 4). The verb relating the subject to the object is "to be" ("be1"), indicated as a present tense verb, which in the third person is "is". The "Dobj", or deep object, of the annotation (in terms of the subject-verb-object of a sentence, not to be confused with a defined virtual object) is a cave ("cave1"); it is also indicated in this case to be indefinite and singular.

A first annotation added to the non-player character's knowledgebase refers to a particular virtual object of the cave with the object identifier tag 242, and is input by the developer, in natural language form, as "There's a dragon in that cave (242)." The developer also adds another natural language annotation that encodes a piece of general knowledge, rather than referencing a particular virtual object, the annotation reading, "Dragons have treasure."

These natural language annotations as input by the developer may also be translated into semantic annotations by a natural language tool associated with or included in the present embodiment. "There's a dragon in that cave(242)" may be semantically represented as:

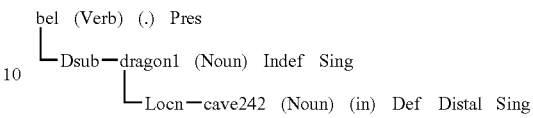

In this semantic annotation, the "Dsub", or the deep subject, is "dragon" ("dragon1"), which is indicated to be a noun. Because "dragon1" is indicated to be indefinite and singular ("Indef" and "Sing"), it refers to a dragon, rather than a particular dragon or multiple dragons. The verb relating the subject to the object is "to be" ("be1"), indicated as a present tense verb. The object of the annotation is a location ("Locn"), which is indicated to be "cave242" (or a noun object named "cave" associated to its semantic annotation by object identifier tag 242), which will associate it with "cave242" from the object semantic annotation, described above.

Similarly, "Dragons have treasure" may be semantically represented as:

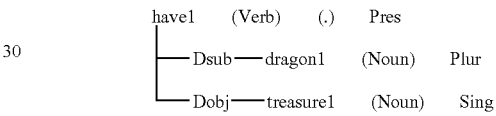

Then, if a player selects cave 242 and selects another non-player character without semantic information about cave 242, that non-player character will only be able to tell the player, "That is a cave." However, if the player selects cave 242 and selects the non-player character having the two semantic annotations above in its knowledgebase, to ask about cave 242, this non-player character will be able to dynamically combine the semantic annotation tagged to cave 242 with these two semantic tags to produce the response, "That cave has treasure in it, but it also has a dragon in it."

Dynamically combining the semantic information in a manner such as this provides for dramatically more sophisticated and interesting interaction with the computer-controlled characters. In different embodiments, both the semantic annotation tagged to a virtual object may change over time, such as to reflect that the cave entrance has caved in so that a cave is no longer apparent; and the semantic information stored in a non-player character's knowledgebase may change over time, such as if the non-player character learns new knowledge, such as to reflect the non-player character having witnessed another player character enter the cave. The response provided by a particular non-player character at various times may therefore show a great variety and remain sensitive to the current context.

Logical forms are relatively easy and intuitive for a developer without prior training to pick up and use. However, those with the training may prefer to write semantic code directly to ensure greater precision. In different embodiments, either or both of these methods along with still other methods, may be used to create the semantic annotations to be associated with the virtual objects.

Whatever mechanism is used to encode the semantic annotations, the semantic annotations can be called on during game play to help provide the responses of computer-controlled characters, and create the illusion that these computer-controlled characters has an understanding of the object—not merely due to pre-scripted outputs, but in dynamically created responses. This distinction provides a dramatic advantage in the sophistication of the responses of a computer-controlled character. While a player who spends a significant amount of time playing a game may quickly find pre-scripted outputs predictable, the dynamically created outputs of the present embodiment may make use of semantic annotations from any combination of available objects as a game progresses. This exponentially multiplies the possible outputs as a virtual world is made bigger and more complex, as well as enabling the computer-controlled character to generate genuinely new responses from new combinations of objects that might have been unforeseen by the game developer or that might only become possible after significant changes have taken place in the virtual world. This becomes especially significant in the case of very large and complex virtual worlds, such as those in which the more popular massively multiplayer online role-playing games (MMORPG) take place—which have had as many as several million subscribers to a game taking place within a single virtual world that has been running for several years. To try, in such a virtual world, to match the possibilities of dynamically generated outputs using semantic annotations, by instead trying to rely on scripted outputs, would be prohibitively difficult if not combinatorially impossible.

Semantic annotations may describe the size, shape, color, history, or any other descriptive properties of a virtual object; the type of annotations are wide and varied, and have no need to be restricted. The semantic descriptions may be attached to some of the more significant objects, if not to all objects, in a virtual world. All the semantic annotations may be tagged to their objects during creation of the virtual world, prior to the beginning of game play within the virtual world; alternatively, for a game that is actively administered, a developer may continue to actively modify or add semantic annotations to objects during game play, or may add new objects with semantic annotations during play. The events and changes within the course of the game, initiated either automatically by the game or by players, may also affect virtual objects in a way that is reflected in automatic changes to their semantic annotations.

Method 300 may also include step 313, to store a depiction comprising virtual objects as a virtual photograph, and the semantic annotations associated or tagged to those virtual objects are also stored with the virtual photograph. Virtual photographs are photographs that are taken with a virtual camera by a player in a 3-D virtual world or game. Although these annotations do not show up by any visible indication in the virtual photograph, they allow the player to use the virtual photos for a richer interaction with the virtual world.

Figure 4:
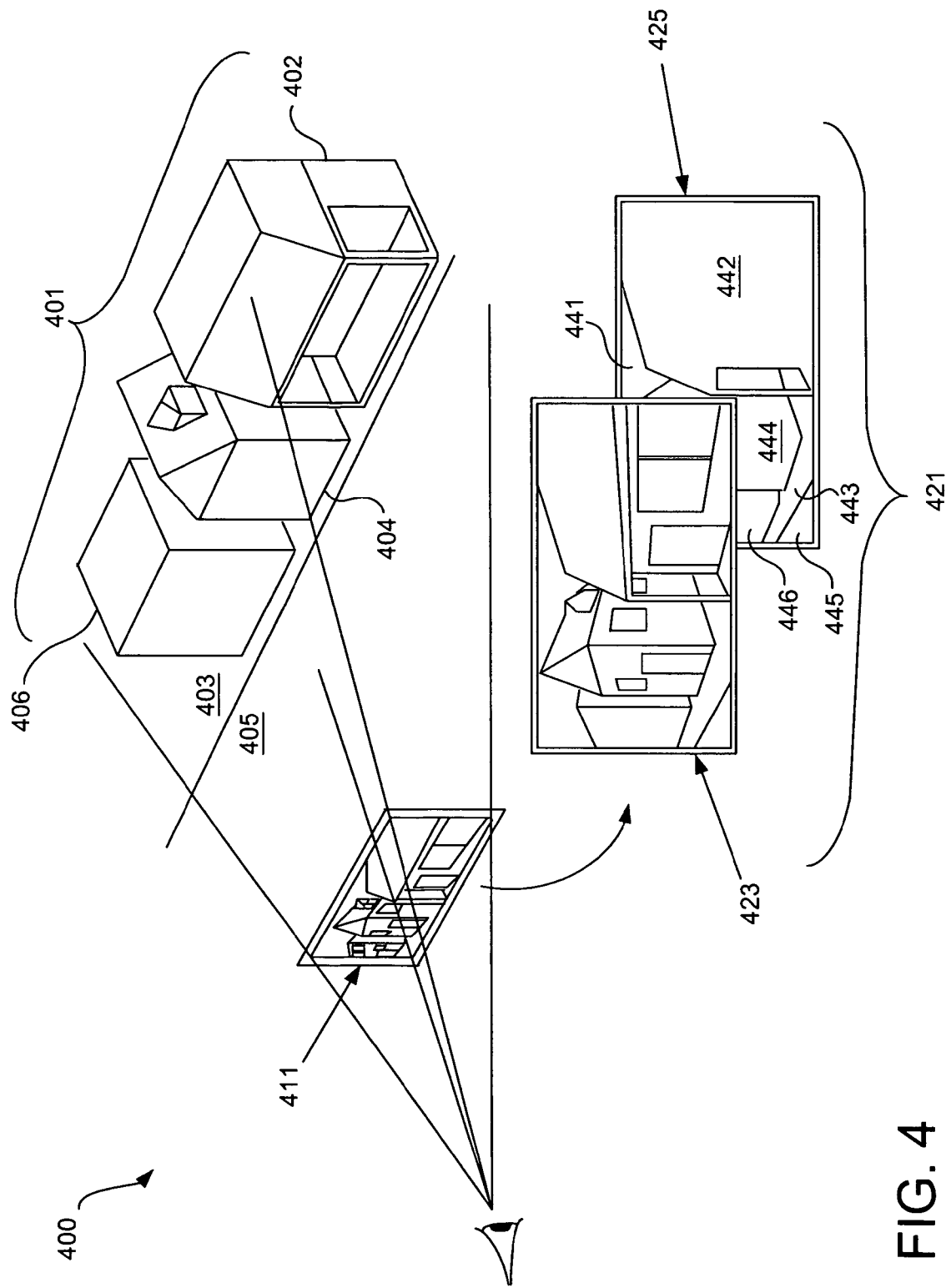
FIG. 4 depicts an image generated in a virtual world, and layers of data associated with the image, as generated by or stored on a computing device, according to another illustrative embodiment.

FIG. 4 depicts what happens when a player takes a virtual photo, according to one illustrative embodiment. FIG. 4 depicts an image 411 of a scene generated in a virtual world 401. Virtual world 401 does not exist outside of the memory of a computing device executing instructions for running virtual world 401, but virtual world 401 is depicted in FIG. 4 as a representation that is modeled in the computer memory. Image 411 includes a perspective view of house objects 402, 404, 406, lawn object 403, and street object 405. When the player takes a virtual photo, the temporary, perspective-view scene of virtual world 401 that coincides with virtual photo 411 is stored as a virtual photo or static image that may be called up and referred to later in the game.

Virtual photo 411 includes two parts or layers: visible photo layer 423 and object identifier field layer 425. Object identifier field layer 425 has a 1-to-1 mapping with visible photo layer 423, but records the object identifier tag for each pixel of virtual photo 411, as opposed to visible photo layer 423, which records the RGB color value of each of the pixels in virtual photo 411. By this means, each pixel in virtual photo 411 is associated with both a visible RGB set of values along with an object identifier tag. The object identifier tags serve as tag anchors that define portions of the virtual photo 411 as belonging to one virtual object or another, or to no virtual object differentiated from the general virtual world 401, in some embodiments. For example, object identifier field 425 includes object identifier tag (or tag for short) 442 for house 402, tag 444 for house 404, tag 446 for house 406, tag 441 for the sky in the virtual world (not numbered in the depiction of virtual world 401), tag 443 for lawn 403, and tag 445 for street 405. The object identifier tags associate each portion of the virtual image 401 with a semantic annotation stored in an accompanying data file. Virtual photo 411 may therefore be stored as a single file of a new file type that incorporates a visible image, an object identifier field with a 1-to-1 mapping onto the visible image, and any number of semantic annotations, having reference associations to each of the object fields defined by the object identifier field. Virtual photo 411 may also be stored in a set of parallel files that are referred to together in later use of the virtual photo, in another illustrative embodiment. For example, virtual photo 411 may be stored as three separate files, including a file for the visible image, another file for the object identifier field mappings, and a third file for the semantic annotations, in another illustrative embodiment.

A mechanism for developing semantic annotations using logical forms, and associating the semantic annotations with the object identifier tags 441-446 of virtual world 401, as depicted in object identifier field 425, according to one illustrative embodiment, is provided as follows. In an illustrative example, a developer using a method or computer-readable media embodiment, such as a software application embodying the present subject matter, to build virtual world 401, may enter a Natural language description reading, "This(441) is the sky". A natural language processing utility, such as a parsing utility, included in or associated with the software application embodiment translates that natural language input into an equivalent semantic annotation. The portion of the input reading "This(441)" may serve to encode a tag between the semantic annotation and tag 441 of object identifier field 425, in one illustrative embodiment. Similarly, the developer may enter additional natural language inputs for the tags of additional objects depicted in the example portion of virtual world 401, as "This(442) is a house with a small storefront", "This(443) is a lawn", "This(444) is a blue house", "This(445) is a street", and "This(446) is a green house".

With the objects thus tagged stored in a virtual photo 411, a player may show photo 411 to a non-player character. The player may then select one of the objects 401-406 in the photo 411, and ask a question or otherwise engage in an interaction with the selected non-player character regarding the object, as a function of the current semantic annotation tagged to the selected object as well as of the semantic contents of the knowledgebase of the selected non-player character. One simple example of a question is, "What is this?" If the selected non-player character has no information referencing the selected object, it provides an answer incorporating only the information from the semantic annotation tagged to the selected information, such as "That is a blue house", in the case of object 404 being selected.

On the other hand, if the non-player character has semantic knowledge of the selected object, then the non-player character may combine that subjective semantic knowledge with the objective semantic annotation tagged to the object, to produce a potentially unique output. For example, the selected non-player character may possess semantic annotations in its knowledgebase equivalent to the natural-language descriptions, "This(444) house is where John(499) lives", and "John(499) is my father". (Reference label 499 is not depicted in FIG. 4.) The non-player character may therefore, in this illustrative example, combine those two semantic annotations from within its own knowledgebase with the semantic annotation tagged by object identifier tag 444 to house object 404, and respond to the question "What is that?" with the output, "That is my father's house." This example briefly illustrates any variety of other subjective semantic annotations a developer may include in the knowledgebase of any computer-controlled character with reference to any virtual object.

This new semantically-annotated image file type can assume a variety of embodiments with applicability across a range of applications, both involving virtual worlds, and involving stand-alone virtual objects, virtual contexts, and virtual characters in a wide variety of applications. For example, a program might include executable instructions that provide semantically tagged images within an application or even a variety of applications, and enable a computing device to store a "semantic screenshot", or a screenshot that is semantically enhanced by storing any semantically tagged annotations from semantically tagged images embedded in any applications with an application interface then being depicted on the screen. The semantic annotation then remains associated with the object as the semantically tagged object is copied from the source application into a screenshot of the semantically-annotated image file type. That semantic information may then be combined with additional semantic information from a reference application. This may take the form of a universal virtual assistant embedded in a user interface, for example, who is able to combine semantic information from a variety of semantically tagged images from across any applications utilizing them, and combine the semantic information from those various sources with its own reference semantic annotations to produce semantic outputs directed to answering the user's questions or helping the user use the source applications more productively. This example is one illustration of virtual objects—including the virtual source embeds and the virtual user interface assistant—that may be put to use in contexts other than virtual worlds.

Returning to the embodiment of a game in a virtual world, when a player interacts with the virtual photo, the visible photo layer 423 is shown and the player can select an object by clicking on or otherwise selecting the image. Any of a wide variety of user input means for selecting an object or indicating a particular position on the screen may be used, in various embodiments. This wide variety of mechanisms may include, for example, pointing a mouse with a cursor and clicking a button on the mouse, tapping a screen with a stylus, voicing a vocal indication delivered through a voice user interface, etc. As another example, this may also include providing a menu of objects present in the photo, enabling a user to select an object from the menu, in another illustrative embodiment.

For example, the player may select an object and refer to that object in an interaction with a computer-controlled character. Which particular object in visible photo layer 423 was selected is determined by referring to the pixel on object identifier field 425 that is mapped from the pixel clicked on or selected in visible photo layer 423. The semantic annotation associated with the particular object field occupied by the mapped pixel is then accessed and referenced in providing an output to the player with regard to the selected object. For example, if the player clicks on the image of house 402 in visible photolayer 423, the particular pixel within the image of house 402 that was clicked on is used to determine the mapped pixel on object identifier field 425, which is found to lie within object field 442. The semantic annotation associated with object field 442 is then accessed and contributed to generating an output that incorporates descriptive properties of house 402. The semantic annotation can be combined with additional semantic information tagged to other discrete objects, to a general context of the environment of the virtual world at that position and time, or to computer-controlled characters, including a computer-controlled character that may be the one to provide this semantically assembled output in response to a user interaction such as a query regarding the selected object.

After a virtual photo is taken, the semantic annotations to the virtual objects in the photo remain static, even if the condition of those objects changes over time in the virtual world, and those changes are reflected in the semantic annotations to those objects in realtime in the virtual world. For example, a player may take a photo of a beech tree. Later, the beech tree is chopped down—perhaps by a computer-controlled character, perhaps by a human player character. A realtime global reference base may reflect the fact that the beech tree has been chopped down, with that change reflected both in changes to the semantic annotation tagged to the beech tree, and in the change in the appearance of the beech tree to an image of a stump. However, the player's virtual photo retains the image of the beech tree as it originally appeared when photographed; the virtual photo also preserves the semantic annotation that was tagged to the beech tree at the time the photo was taken, which includes terms that semantically describe an upright, living beech tree, and which persists independently of the global reference base or the realtime semantic annotation for the beech tree.

There are two types of semantic information that may be used in different descriptions of a virtual object such as the beech tree or such as house 402, according to the present illustrative embodiment. The first is generic, objective information, which is the type stored in the semantic annotation of the object itself, in this embodiment. The second type of semantic information is subjective, context-sensitive information. For example, a computer-controlled character, also known as a non-player character, may have a relatively large body of semantic information tagged to him, among which are included subjective semantic annotations tagged to other objects. For example, a particular non-player character named Zoltar may have a semantic annotation tagged to the beech tree that includes knowledge of who cut it down (whether a player character or a non-player character); he may also have a semantic annotation tagged to house 402 that includes knowledge of who resides in it. The non-player character may refer to semantic annotations tagged only to his own self that indicate that it was he who chopped down the beech tree or who lives in house 402. As another alternative, the non-player character may have received information from observation or from being informed by another player or non-player character, the information being encoded in his semantic annotations.

A player character who asks the non-player character what happened to the birch tree or who lives in house 402 may thereby receive an output from one non-player character without subjective semantic annotations tagged to the beech tree or house 402, who may respond to the player's query without the benefit of relevant semantic annotations other than what are tagged to the objects themselves; and may therefore tell the player character, the beech tree has been chopped down, or, that house is blue. Another character endowed with additional semantic annotations tagged to those objects may respond to the player by combining the indication of what object the player has selected with its own semantic annotations to generate, on the spot, a remark to the player that he saw a tall man in a black cloak chop the tree down the previous night, or that his brother lives in the blue house. Computer-controlled characters are therefore enabled to dynamically provide a semantic output based on the semantic annotations associated with the objects and the semantic annotations associated with themselves as computer-controlled characters.

This may be the case when the player character shows the non-player character a virtual photo the player character took earlier, and the non-player character combines semantic annotations tagged to the objects in the virtual photo with its own semantic annotations to generate an answer. In another embodiment, the player may also be able to select an object in realtime to ask the non-player character about, and the non-player character will access the current state of the non-static semantic annotations from the object in realtime to incorporate into its response. In either of these two illustrative embodiments, the non-player character may combine semantic annotations from the selected object and from separate sources of semantic annotations to generate a fresh response after a player character interacts with the non-player character with reference to the selected object or objects. The computer-controlled character is thereby enabled to dynamically create semantic output in realtime.

Contextual semantic annotations can also be tagged elsewhere besides to a non-player character. As another illustrative example, a generalized contextual semantic annotation may be tagged to a fairly large region of a virtual world for a specified duration of time. For example, one day it may rain in a virtual world. A semantic annotation may be tagged to a broad region of the virtual world for several hours at a time, providing the description of the rainy conditions, which may be superimposed on the discrete objects of the virtual world. In terms of object identifier fields, a general "rainy" object identifier may be superimposed three-dimensionally over all outdoor, unsheltered space within a restricted section of the internal model of the virtual world, resulting in a two-dimensional "rainy" object identifier being superimposed over the whole perspective view for a player in an outdoor, unsheltered position. This may take the form of adding a "rainy" semantic description to the semantic annotations of all relevant object identifiers in the field of view, for example. If a player takes a virtual photo in such a situation and later selects a beech tree in the virtual photo to ask a non-player character about it, the non-player character may combine the generalized "rainy" semantic description with the other available semantic information. In this case, for example, instead of saying "The tall man hadn't yet chopped down the tree", the non-player character might say, "The tall man hadn't yet chopped down the tree—perhaps he had to wait because it was raining."

A wide variety of contexts and other descriptives may be embodied in semantic annotations. A boat in the middle of an ocean is another example of a context that can be semantically tagged and contribute to a non-player character's remarks. Physical actions can also be semantically tagged. A non-player character can be sitting by lake fishing, with the act of fishing encoded in a semantic annotation tagged to the character. The non-player character may have an animation cycle he goes through of casting, waiting, and reeling it in. The information describing those specific actions, along with the general act of fishing, is available in semantic annotations on the particular animation cycle.

How a non-player character incorporates semantic information tagged to objects in a field of view may be made more sophisticated by taking account of the conditions in which the character is able to see the virtual object, in another illustrative embodiment. For example, if a virtual photo is tagged with a "sunny" general context annotation, a character shown the photo may be able to recognize someone she knows who appears far away and small in the photo. However, if the general context of the photo is tagged with a "heavy rain" or a "dusk" annotation, the non-player character may not be able to recognize the person in the photo whom she knows, despite the presence of the subject's object identifier where the player is clicking or selecting in the photo.

Similarly, if a subject character is hiding behind a tree in a virtual photo, with only a foot sticking out, a player who shows the photo to a non-player character and selects the foot may not be able to get the non-player character to identify the subject character, even if the subject character is the brother or good friend of the non-player character. A virtual photo of a subject character wearing a mask, with only the eyes and chin visible, also may not be enough for a respondent non-player character to identify the subject from the virtual photo, despite being familiar with the subject. This may be accomplished, for example, by having a scattering of particular pixels across the subject character's object identifier invisibly selected as facial recognition or body recognition scoring markers, such that another non-player character can only recognize the subject character if enough of the recognition marker pixels are in view to score high enough on a recognition scale, where a non-player character who is very familiar with the subject character has a lower threshold score before he can recognize the subject character. This recognition heirarchy mechanism may be equally applicable to a photo of a non-player character or a player character with whom the viewing non-player character is familiar.

A player may have a wide variety of different options available when selecting an object, in another illustrative embodiment. The context may also be incorporated to respond to a user selection from among several available user options. These options may include asking a non-player character various context-relevant questions about the selected object, from among several optional actions. For example, a player may select an object and ask the non-player character, "what is behind this house", or, "who owns this house".

Another issue which is addressed in the present embodiment, to ensure sophisticated virtual world interaction, is the issue of empty spaces with significant meaning. For example, a doorway is itself empty space, but may nevertheless be of interest to a player, as opposed to whatever object is visible through the doorway. One embodiment addresses this issue with the use of invisible objects. An invisible object is simply an object identifier that overlaps other object identifiers on the object identifier field component of a semantically annotated image file, with no corresponding image portion on the visible image component of the file. For example, a player may wish to select a doorway and ask a non-player character what she knows about what is on the other side of it, or if she knows if it is safe to go through. The doorway is defined as the space between the doorframe, and through it are visible a field and the sky. In the absence of invisible objects, if the player tries to select the doorway, she will only select either the field or the sky, but she does not want to ask the non-player character about the field or the sky. Similarly, trying to select the doorframe may be interpreted as a selection just of the doorframe as opposed to the doorway, or as a selection of the wall. Instead, an invisible object of the appropriate size and dimensions of the doorway is placed over the doorway—which might appear as a solid door, if it were not invisible. The object identifier of the invisible object covers over the object identifiers of the field and the sky in the two-dimensional projection of the three-dimensionally modeled virtual world, as seen by the player. The player may therefore select the doorway, and appear to herself to be actually selecting the field or sky, but the non-player character will access the semantic annotation of the invisible object instead, and offer responses incorporating information about the doorway rather than about the field and sky.

There may be a conflict between the invisible object and the visible object, introduced by this feature. The player may actually want to select the field outside the doorway to ask the non-player character what is growing in the field, while the non-player character takes the understanding of the player selecting the invisible object doorway. This may be resolved with options for both overlapping objects in a menu that pops up when the player selects the sky through the doorway, with a default for the invisible object and the option to choose the further, visible object instead. The option of both objects to choose from may be embodied in the object identifier field by either a layered identifier field, which employs more than one two-dimensional field, with an indication of heirarchy between the fields; or by a single object identifier that temporarily combines identification with both objects, with tags to both semantic annotations, so that they can be chosen between.

The embodiments related to computer games are only an illustrative example, and other embodiments are not limited to games. In various additional embodiments involving a virtual world with semantically tagged objects, for example, the virtual world may serve as a training or educational program. Developers may also be enabled by various embodiments to create virtual worlds with semantically tagged objects for such training or educational programs. This may include, for example, training and testing programs for firefighters, policemen, or astronauts. It may also include training and testing programs for medical students, for example, to simulate emergency room experiences where they must evaluate injuries and symptoms and ask appropriate questions of persons accompanying the patient of what they saw of the injury or what potential symptoms they might have noticed at earlier times. It may also include training and testing programs for science students, who are presented with virtual models of scientific phenomena, and may try to come up with the right clues to ask of a virtual Professor Einstein computer-controlled character as they try to calculate answers to problems involving the interactions depicted in the virtual world, in another illustrative embodiment.

Figure 5:
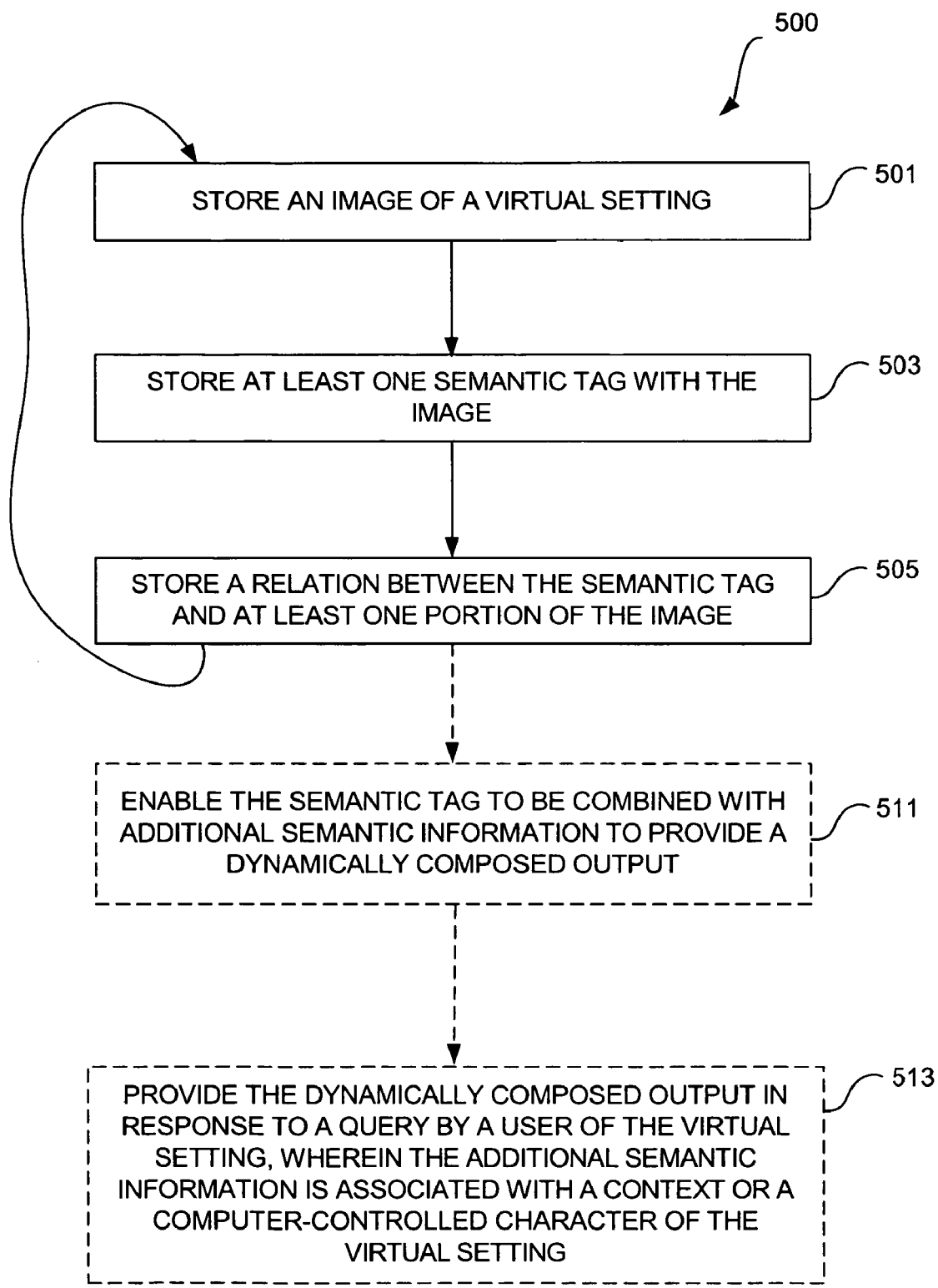
FIG. 5 depicts a flowchart for a method of storing an image of a virtual setting, a semantic tag, and a relation between the semantic tag and a portion of the image, according to an illustrative embodiment.

FIG. 5 is provided to present a perspective on another embodiment that depicts a variation on several elements described above, to illustrate further some of the variety of the possible embodiments. FIG. 5 depicts a flowchart for a method 500 of storing an image of a virtual setting, a semantic tag, and a relation between the semantic tag and a portion of the image, according to an illustrative embodiment. Method 500 may be implemented at least in part by a computing device, such as computer 110 or remote computer 180 of FIG. 1 or mobile computing device 201 or computing resources 224, 226 of FIG. 2, for example.

FIG. 5 includes step 501, to store an image of a virtual setting; step 503, to store at least one semantic tag with the image; and step 505, to store a relation between the semantic tag and at least one portion of the image. Steps 501-505 may be repeated many times, to store several such semantically tagged images of one or more virtual settings.

Method 500 may also include step 511, to enable the semantic tag to be combined with additional semantic information to provide a dynamically composed output. Method 500 may also include step 513, to provide the dynamically composed output in response to a query by a user of the virtual setting, wherein the additional semantic information is associated with a context or a computer-controlled character of the virtual setting.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented at least in part by a computing device comprising one or more processors, the method comprising:

providing, using one or more of the processors, at least one virtual object;

associating, using one or more of the processors, a semantic annotation with the virtual object;

providing, using one or more of the processors, a plurality of computer-controlled characters each having a different associated semantic knowledgebase associated therewith, in which the semantic knowledgebases are independent of the virtual object and the semantic annotation associated with the virtual object;

receiving a user-input selecting the virtual object by taking a virtual photograph of the virtual object and presenting it to any given one of the computer controlled characters;

automatically generating a query to the given computer-controlled character, the query corresponding to the virtual object presented to the given computer-controlled character;

dynamically providing, using one or more of the processors, a natural language output associated with the given computer-controlled character, in which the natural language output is responsive to the query and is based on a dynamic combination of the semantic annotation associated with the virtual object and the semantic knowledgebase associated with the given computer-controlled character, such that a natural language output from another computer-controlled character, that has an associated knowledgebase different from the knowledgebase associated with the given computer-controlled character, is different from the natural language output from the given computer-controlled character;

enabling a user to take the virtual photograph of an arbitrarily selected scene within the virtual world, in which the scene comprises the virtual object; and storing a depiction of the scene comprising the virtual object as a virtual photograph, including storing the semantic annotation associated with the virtual object in a state the semantic annotation has at the time the virtual photograph is taken, with the virtual photograph, in which the semantic annotation is attached to the image of the virtual object in the virtual photograph.

2. The method of claim 1, in which the natural language output is based on a dynamic combination with a semantic annotation that is tagged to a context of a place and time in the virtual world to dynamically create semantic output in real-time.

3. The method of claim 1, wherein the semantic annotation is created by parsing a natural language input.

4. The method of claim 1, wherein the virtual object with which the semantic annotation is associated is an invisible object.

5. The method of claim 1, further comprising altering the semantic annotations associated with the virtual object to a new state in response to an event that occurs in the virtual world, enabling the given computer-controlled character to come in contact with the virtual object in the virtual world after the event, altering the semantic knowledgebase associated with the given computer-controlled character by adding one or more of the altered semantic annotations associated with the virtual object to the semantic knowledgebase associated with the given computer-controlled character, and in which the natural language output from the given computer-controlled character is based at least in part on the altered semantic knowledgebase.

6. The method of claim 1, further comprising altering the semantic knowledgebase associated with the given computer-controlled character is based on events that the given computer-controlled character observes in the virtual world, and in which the natural language output from the given computer controlled character is based at least in part on the altered semantic knowledgebase associated with the given computer-controlled character.

7. The method of claim 1, further comprising altering the semantic annotation associated with the virtual object based on events in the virtual world that influence the virtual object, and in which the natural language output from the given computer-controlled character is based at least in part on the altered semantic annotation associated with the virtual object.

8. The method of claim 1, further comprising enabling a user to show the virtual photograph to the given computer-controlled character, and providing a natural language output associated with the given computer-controlled character in which the natural language output is based on a dynamic combination of the semantic annotation attached to the virtual object in the virtual photograph, and the semantic knowledgebase associated with the given computer-controlled character.

9. A non-transitory computer-readable storage medium comprising computer-executable instructions which, when executed by a host computer, configure the host computer to:
receive input defining an object in a virtual world;
associate a semantic annotation with the object;
provide a plurality of different computer-controlled characters each having a different semantic knowledgebase associated therewith in which the semantic knowledgebases are independent of the object in the virtual world and the semantic annotation associated with the object;
receive a user input generating a photograph of the virtual object, the photograph including the semantic annotation, and presenting the photograph to a given one of the computer-controlled characters;
in response to presenting the photograph to the given computer-controlled character, automatically generate a query to the given computer-controlled character;
dynamically provide, using one or more of the processors, a natural language output associated with the computer-controlled character, in which the natural language output is responsive to the query and is based on a combination of the semantic annotation associated with the virtual object and the semantic knowledgebase associated with the computer-controlled character; and
enable a user to take the photograph as a virtual photo of the object within the virtual world, such that the semantic annotation associated with the object is stored with the photo at the time the photo is taken, and in a state the semantic annotation is in at the time the photo is taken, and remains associated with the object in the virtual photo.

10. The medium of claim 9, wherein the executable instructions further enable a computing device to receive an input relating to the object, and provide the semantic annotation based on the input relating to the object.

11. The medium of claim 10, wherein the executable instructions further enable a computing device to receive the input relating to the object as a natural language input, and automatically create the semantic annotation by parsing the natural language input.

12. The medium of claim 9, wherein the executable instructions further enable a computing device to store the object in a semantic screenshot, in which the semantic annotation remains associated with the object, and is stored in association with the object at the time the screenshot is stored; and to provide a set of combined semantic information based on the semantic annotation in the semantic screenshot and a set of semantic information from a separate application.

13. A method, implemented at least in part by a computing device comprising one or more data storage components, the method comprising:
storing, using one or more of the data storage components, an image of a virtual setting;
storing, using one or more of the data storage components, at least one semantic tag with the image;
storing, using one or more of the data storage components, a relation between the semantic tag and at least one portion of the image;
storing, using one or more of the data storage components, a plurality of different computer-controlled characters, each having a different semantic knowledgebase associated therewith in which the semantic knowledgebase for each computer-controlled character is independent of the image and the semantic tag stored in relation to the at least one portion of the image;
responding to a query, by a user of the virtual setting, of the at least one portion of the image, by dynamically providing a natural language output associated with a given one of the computer-controlled characters, in which the natural language output is based on a combination of the semantic tag and the semantic knowledgebase associated with the given computer-controlled character such that a response from another computer-controlled character, with a different associated semantic knowledgebase, is different from the natural language output from the given computer-controlled character;
enabling a user to take the virtual photograph of an arbitrarily selected scene within the virtual world, in which the scene comprises the virtual object; and
storing a depiction of the scene comprising the virtual object as a virtual photograph, including storing the semantic annotation associated with the virtual object in a state the semantic annotation has at the time the virtual photograph is taken, with the virtual photograph, in which the semantic annotation is attached to the image of the virtual object in the virtual photograph.

14. The method of claim 13, further comprising combining the semantic tag with additional semantic information to provide a dynamically composed output; and providing the dynamically composed output in response to a query by a user of the virtual setting, wherein the additional semantic information is received from semantic tags associated with a context of the virtual setting when the query is received.

15. The method of claim 13, further comprising combining the semantic tag with additional semantic information to provide a dynamically composed output; and providing the dynamically composed output in response to a query by a user of the virtual setting, wherein the additional semantic information is received from semantic tags associated with a computer-controlled character of the virtual setting when the query is received.

16. The method of claim 13, wherein the image comprises pixels that each have associated with them color component values and an object identifier, wherein the at least one portion of the image has a single object identifier associated with each of the pixels comprised in that portion of the image.

17. The method of claim 13, wherein the virtual setting is modeled as a three-dimensional virtual world, and the image is stored as a two-dimensional virtual photograph of a scene in the three-dimensional virtual world.

* * * * *